Oct. 8, 1968 R. J. EMARY 3,404,785
PANEL BOARD RETAINING CLIP
Filed May 27, 1966
FIG. 1
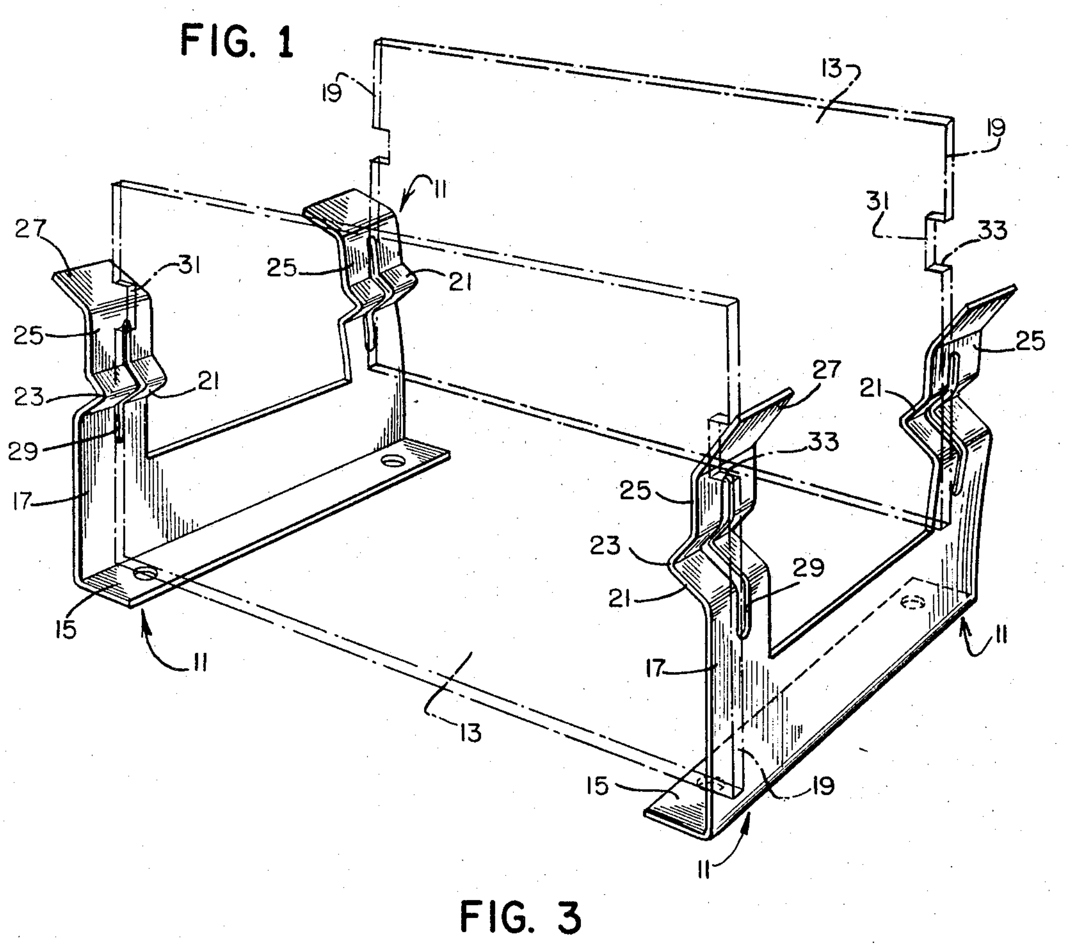
FIG. 3
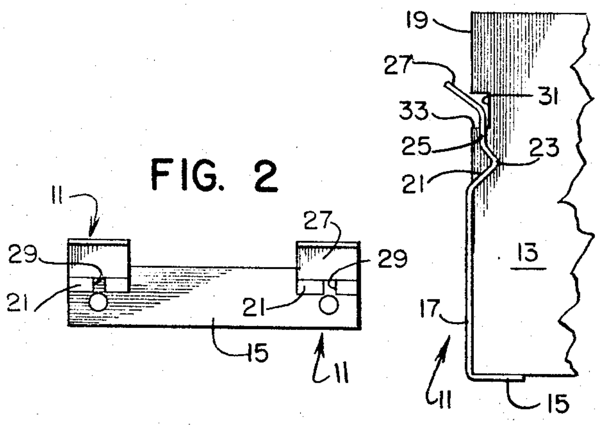
FIG. 2, FIG. 3
FIG. 4
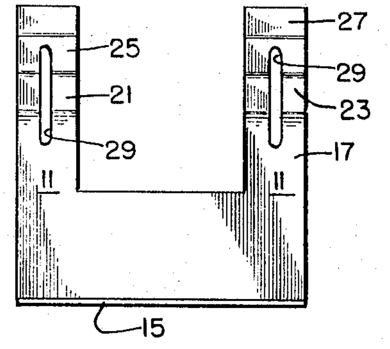
Inventor
ROBERT J. EMARY
BY Silverman & Cass
ATTYS.

3,404,785

PANEL BOARD RETAINING CLIP

Robert J. Emary, Oberlin, Ohio, assignor to Gilford Instrument Laboratories, Inc., Oberlin, Ohio, a corporation of Ohio Filed May 27, 1966, Ser. No. 553,365
10 Claims. (Cl. 211—183)

ABSTRACT OF THE DISCLOSURE

A unitary and resilient clip for latching into and thereby holding in an upstanding orientation a panel member having a notched formation in its lateral edge. The clip has arm and leg portions lying in parallel, yet offset, planes which are interconnected by an inwardly directed segment. A medial slot traverses the interconnecting segment and portions of the arm and leg, bifurcating especially the segment and an adjacent portion of the arm—the latter defining the latching portion of the clip which seats into the notch in the panel.

This invention relates to mechanical supports for panel boards and similar planar members and, more particularly, to resilient clips which guide the lateral edges of a planar member into a predetermined location, lock the member against inadvertent removal, and support the member against transverse displacement.

The widespread use of panel boards carrying electrical components; i.e., printed circuit boards, has lead to numerous types of housings for providing electrical connection and mechanical support of the panels in electronic cabinetry. Normally, such cabinetry houses numerous panel boards associated with complex electronic devices to be serviced by particularly trained electronic technicians. For obvious reasons, such electronic cabinetry normally is carefully mounted to avoid mechanical shock and other environmental variables which would be adverse to the electronic equipment.

In contrast to above described use and associated cabinetry is the increasing utilization of electronic panel boards in combination with relatively portable non-electronic equipment which is not sensitive to abrupt motion and is serviced by those skilled in other than the electronic field. In such an environment, the panel board and its associated cabinetry must be provided with means aiding in the positioning of the panel board with respect to its multi-terminal receiving electric socket, supporting the panel in that position, and restraining it from inadvertent removal. Because of the associated cabinetry and service personnel, such supporting, guiding, and restraining means should be mechanical, and remote from the electric socket, as well as compact and easily mountable in the cabinetry. Accordingly, it is a primary object of this invention to provide an improved mechanical support for panel boards.

It is another object if this invention to provide support which locks into the lateral edges of a panel board to prevent inadvertent removal.

It is another object of this invention to provide a support which guides the movement of a panel board with respect to its ultimate position.

It is a further object of this invention to provide a unitary, easily fabricated, compact, and inexpensive mechanical support for panel boards and the like.

In accomplishing these objects there has been provided a unitary and flexible clip member having generally planar leg and arm portions joined by an interconnecting segment such that the arm and leg extend in opposite directions from the segment with the arm and leg lying in parallel and offset planes from one another. The segment and adjacent portions of the arm and leg are bifurcated by a slot which receives the lateral edge of a panel board having a notch which latches into the slot in the arm.

Other objects and advantages of this invention will become more aparent from the following description of a preferred embodiment taken in conjunction with the accompanying drawings in which:

FIG. 1 is a perspective view of a pair of the inventive clips supporting therebetween two panel boards, one of which is only partly inserted;

FIG. 2 is a top plan view of one of the retaining clips shown in FIG. 1;

FIG. 3 is a side elevational view of a retaining clip and a portion of an interlocked panel; and FIG. 4 is a front elevational view of the clip structure shown in FIG. 1.

For ease of describing the subject retaining clip, terms will be employed relating it and the associated panel board to a vertical plane, as shown in the figures; however, as will become evident, such orientation is by means of example and, in fact, this invention is especially well suited to operate in any orientation, even against the combined pull of gravity and considerable external vibration. Also, terms such as inward and outward relate to directions toward and away from the edges of the retained panel.

Inasmuch as it may be desired to support more than one panel and that these panels be adjacent one another, a plurality of retaining clips 11 can be fabricated from a single piece of resilient material, thereby forming a physically contiguous structure having a plurality of independently operable clip portions 11. For example, FIGS. 1, 2 and 4 illustrate a structure having two interconnected clip members 11. As shown in FIG. 1, each clip is positioned at the lateral end of a panel board 13 and cooperates with the clip at the opposite end of that board to position and retain the board.

Although this invention was first employed as a mechanical support for electrical printed circuit boards, it is equally adapted for use with other forms of generally planar members. Accordingly, neither the figures nor the specification are meant to limit the scope of equivalents of the element 13.

Each clip 11 has an inwardly turned base 15 which may be secured to a chassis, not shown, by conventional fasteners. At a substantially right angle to the base 15 is an upstanding or vertically extending leg 17 which acts as a flexible brace as well as a laterally confining wall for the lateral edges 19 of the panel 13. Projecting upwardly and inwardly of the leg 17 is a nose portion or protuberance 21 which terminates shortly after a sharp reverse bend 23. Continuing from the upward end of the nose 21 and connected thereby to the leg 17 is an arm 25 which is disposed in a plane parallel to that of the leg 17, yet is inwardly displaced therefrom. This physical orientation is preferably accomplished by forming the segment of the nose lying between the leg 17 and the bend 23 longer than the nose segment between the bend 23 and the arm 25. Completing the profile of the retaining clip 11 is an outwardly sloping entrance guiding lip 27 which has its inward end joined to the arm 25.

As best seen in FIG. 4, the clip contains a centered slot 29 which commences near the upper end of the leg 17 and continues through the nose 21 and most but not all of the arm 25, essentially bifurcating the latter two portions and enabling them to guidably receive the lateral edge 19 of a downwardly inserted panel 13.

From the foregoing brief description and the figures it should now be apparent that the legs 17 of two facing clips 11 are to be mounted parallel one another and separated by a distance equal to the lateral dimension of the panel board. With such orientation, the proper positioning of a panel is easily accomplished during its movement toward the base portion 15. The bottom and adjacent lateral edges of the panel will first be laterally guided by the entrance lips 27 which direct the bottom corners and then the lateral edges 19 of the panel into and through the portion of the slot 29 that divides the arm 25. As the panel is moved closer to the base 15, its lateral edges are surrounded and guided by the bifurcated nose 21 in a manner which closely limits movement transverse the plane of the panel. During and after the insertion of the panel, the legs 17 of the two opposing clips prevent lateral displacement of the panel.

Since the arm 25 lies inward of the leg 17, during insertion of the panel, the upper portions of opposing clips are spread apart, as shown in FIG. 1 with respect to the rearmost panel and its associated clips. Accordingly, the unitary clips which are to be of resilient material, are biased inwardly and frictionally engage the edges of the panel.

Although such peripheral frictional engagement may be sufficient to hold the panel in position under many environmental conditions, certain environments make it necessary to increase the holding power to the point of positive latching of the board within the clip. To achieve such goal, one or both of the lateral edges of the panel are formed with a small rectangular notch 31 which, as shown in FIGS. 1 and 3, enables the upper end of the slotted portion of the inwardly biased clip to slide over the bottom side 33 of the notch and seat thereover as a detent. Hence, removal of the panel is inhibited until such time that the clip is forcefully sprung outwardly and the upper end of the slot 29 in the arm 25 is laterally beyond the edge 19 of the panel.

It will be appreciated that although the guide lip 27 and base 15 increase the usefulness of the subject retaining clip, they are not essential. Also, the nose portion 21 could be replaced by an interconnecting structure or segment of different formation. What is essential is that the arm 25 lies inward of the leg 17 and that for latching purposes a portion of the arm and the interconnecting formation 21 be bifurcated sufficient to receive a portion of the lateral edge 19 of the panel including the side 33 of the notch 31.

From the foregoing it will be seen that a simple, economic, yet suitably efficient panel retaining means has been provided and that while there has been described and illustrated a preferred embodiment, it will be apparent to those skilled in the art that variations may be made therein without departing from the spirit of the invention.

What is claimed is:

1. A panel retaining clip comprising:
a generally planar leg,
a generally planar arm parallel to and disposed to one side of the plane of the leg, and
an interconnecting segment contiguously joining said leg to said arm,
said interconnecting segment and an adjacent portion of said arm being bifurcated and adapted to receive therewithin the lateral edge of a panel, at least one of said arm and said leg providing a lateral retaining limit for a received panel.

2. A panel retaining clip as defined in claim 1 in which:
the distance along said interconnecting segment between said arm and said leg is longer than the distance between the planes of said leg and said arm.

3. A panel retaining clip as defined in claim 2 in which:
an intermediate portion of said interconnecting segment extends further to said one side of the plane of said leg than said arm.

4. A panel retaining clip as defined in claim 3 in which:
said leg and said arm extend in opposite directions from said interconnecting segment, and
said clip is of unitary construction and is of resilient material.

5. A panel retaining clip as defined in claim 1 further comprising:
a guide lip connected to said arm and angularly projecting over and beyond the plane of said leg.

6. A panel retaining clip as defined in claim 1 further comprising:
a base portion coupled generally perpendicularly to said leg remote from said interconnecting segment.

7. A panel retaining clip as defined in claim 1 in which said interconnecting segment and adjacent portion of said arm are bifurcated by a continuous slot having a width slightly in excess of the width a lateral edge of a panel to be retained therein.

8. In combination with a generally rectangular panel having thin lateral edges, at least one of which is provided with a notched formation,
a resilient mechanical element for guiding said generally rectangular panel into a predetermined position by relative sliding engagement with the thin lateral edges of the panel and for latching the panel into the predetermined position by forming a detent over one side of the notch in the lateral edge of the panel, said mechanical element comprising:
a leg securable parallel to and in close proximity to the lateral edge of the panel,
an arm generally parallel to said leg and disposed inward of said leg and lateral edge of the panel,
a portion of said arm and the one side of the notch in the panel intersecting when the panel is in the predetermined position, said leg being remote from the point of intersection, and
a generally inwardly directed formation connecting said leg to said arm,
said formation and said arm, to just beyond said point of intersection, being bifurcated sufficient to receive the lateral edge of the panel,
whereby the bifurcated portions of said element are disposed on opposite sides of the panel for guiding and supporting thereof and the terminus of the bifurcation in said arm forms a detent to the side of the notch preventing the translation of the panel without prior flexing of the element which deflects said arm outward of the notch.

9. A combination as defined in claim 8 in which:
a portion of said bifurcated formation extends further inward than said arm and further comprising,
a guide lip connected to an end of said arm distant from said formation and of such length and angular disposition to project outward of said leg.

10. The combination as defined in claim 8 and further comprising:
a second notched formation in a lateral edge of said panel, said lateral edge lying generally parallel to said one lateral edge, and
a second of said mechanical elements positioned for coacting with said second notched formation.

References Cited

UNITED STATES PATENTS

| | | | |
|---|---|---|---|
| 2,108,950 | 2/1938 | Stober | 211—184 XR |
| 2,698,472 | 1/1955 | Knohl | 24—73 XR |
| 3,008,249 | 11/1961 | Masters | 35—63 |
| 3,216,580 | 11/1965 | Fricker | 211—41 |

JOHN PETO, *Primary Examiner.*